United States Patent [19]
Kress

[11] Patent Number: 5,125,772
[45] Date of Patent: Jun. 30, 1992

[54] SINGLE CUT REAMER WITH CHIP GUIDING DEVICE

[75] Inventor: Dieter Kress, Aalen, Fed. Rep. of Germany

[73] Assignee: Mapal Fabrik fur Prazisionswerkzeuge Dr. Kress KG, Aalen, Fed. Rep. of Germany

[21] Appl. No.: 319,620

[22] Filed: Mar. 6, 1989

[30] Foreign Application Priority Data

Mar. 5, 1988 [DE] Fed. Rep. of Germany ....... 3807224

[51] Int. Cl.⁵ .............................................. B23D 77/00
[52] U.S. Cl. ........................................ 408/57; 408/56; 408/199
[58] Field of Search ............... 408/199, 201, 203, 227, 408/229, 713, 705, 59, 186, 179, 181, 57, 56; 175/406, 396

[56] References Cited

U.S. PATENT DOCUMENTS

| | | | |
|---|---|---|---|
| 2,360,385 | 10/1944 | Anderson | 408/59 |
| 3,320,833 | 5/1967 | Andreasson | 408/705 |
| 4,133,089 | 1/1979 | Heymanns | 408/56 X |
| 4,279,550 | 7/1981 | Kress et al. | 408/59 |

FOREIGN PATENT DOCUMENTS

| | | | |
|---|---|---|---|
| 313138 | 7/1916 | Fed. Rep. of Germany | 408/227 |
| 1922131 | 11/1972 | Fed. Rep. of Germany | |
| 514221 | 2/1955 | Italy | 408/59 |
| 221210 | 11/1985 | Japan | 408/199 |
| 858800 | 1/1961 | United Kingdom | 408/56 |
| 1435339 | 5/1976 | United Kingdom | 408/181 |

Primary Examiner—Larry I. Schwartz
Assistant Examiner—Robert Schultz
Attorney, Agent, or Firm—Akoo - Toren

[57] ABSTRACT

A single-blade reamer (30) is disclosed with a cutter plate having a cutter blade (5) and attached to the base body (20), and with two guide strips (6, 7) disposed at the circumference of the base body. A chip-guide device (8, 9, 10, 11) is disposed between the cutter plate or, respectively, the cutter blade (5), and the first guide strip (6) following at an angular distance relative to the cutter (5) as seen from a point of a fixed external coordinate system when the reamer (30) is rotating in a proper cutting direction and/or between the first guide strip (6) and a second guide strip (7), disposed opposite to the cutter blade (5).

7 Claims, 2 Drawing Sheets

SINGLE CUT REAMER WITH CHIP GUIDING DEVICE

BACKGROUND OF THE INVENTION

1. Field of the Invention

The present invention relates to a single-blade reamer with a cutter plate attached to a base body.

2. Brief Description of the Background of the Invention Including Prior Art

Single-blade reamers of the recited kind are for example known from the German Patent Application Laid Out DE-AS 1,922,131. They are characterized by a cutter plate or, respectively, a cutter blade, and two guide strips disposed at the circumferential face of the base body of the reamer. The first guide strip of the cutter follows by about 40 to 45 degrees, as seen in rotation direction, and the second guide strip is disposed opposite to the blade. Such a reamer is supported in the borehole to be machined at the blade and at the two guide strips. The final dimensions of the borehole to be machined result from the distance of the blade relative to the second guide strip. The borehole dimension is only accurate, if the second guide strip, disposed opposite to the cutter plate, rests at the borehole wall.

Since single-blade reamers serve to provide a fine machining of boreholes, it is necessary in most cases to prepare and to premachine these bores, for example, by lowering these bores, for the fine machining and fine processing. The chip volume in this premachining is in general relatively large, where the chips generated are thick, and in particular long in case of steel processing. It is necessary to carefully remove the chips generated during the premachining before the fine machining of the bores is started. This does not succeed in all cases, in particular in case of fully automatic processing of parts. If chips, generated during the premachining, remain in the borehole, then these chips can pass into the intermediate space between the bore wall and the circumferential face of the base body of the reamer, which intermediate space is delimited by the cutter plate and a first guide strip, following at a distance to the cutter plate or, respectively, by a first and second guide strip, and can get jammed at this location. If the chips have a corresponding thickness and shape, then the bore diameter is thereby changed which, in a standard case, is defined by the distance between the cutter blade and the oppositely disposed surface of the second guide strip. In addition, the surface quality of the bore wall can be substantially interfered with by such chips included from the premachining stage. Attempts to remove the chips by increased chilling agent pressure have not been successful, since the shape of the chips, generated during the premachining, can thereby not be influenced and, according to experience, in particular during lowering, there are generated relatively long, coiled chips of large thickness, which are stuck in part in the borehole and protrude in part beyond the edge of the borehole.

SUMMARY OF THE INVENTION

1. Purpose of the Invention

It is an object of the invention to provide a single-blade reamer, where the chips present in the borehole to be generated are safely removed such that the end dimension of the borehole is not affected.

It is a further object of the present invention to practically eliminate an interference by chips generated during premachining with the surface quality of the borehole wall.

It is yet a further object of the present invention to provide a reamer which allows to provide an easy and safe way for the removal of drilling chips.

These and other objects and advantages of the present invention will become evident from the description which follows.

2. Brief Description of the Invention

The present invention provides for a single-blade reamer comprising a base body adapted to form a base for a reamer structure. A cutter plate is attached to the base body. A first guide strip is attached to the base body and disposed at the circumference of the base body. A second guide strip is attached to the base body and disposed at the circumference of the base body angularly remote relative to the cutter blade. A chip-guide device is disposed angularly between the cutter blade and the second guide strip disposed angularly remote relative to the cutter blade. Said chip guide device follows the cutter blade at an angular distance as seen from a point of a fixed external coordinate system when the reamer is rotating in a proper cutting direction.

A method of drilling bores comprises the forcing of a base body against a structure to be drilled. The base body is adapted to form a base for a reamer structure with a cutter plate attached to the base body. A first guide strip is attached to the base body and disposed at the circumference of the base body. A second guide strip is attached to the base body and disposed at the circumference of the base body angularly remote relative to the cutter blade. The base body is rotated. Chips are generated with the cutter blade. Chips generated by the cutter blade pass in general into the chip space, which is formed by the face of the base body running at an inclined angle toward the blade and by the borehole wall. Chips passing accidentally into the intermediate space between base body of the reamer and the borehole wall are collected and guided with a chip-guide device disposed angularly between the cutter blade and the second guide strip disposed angularly remote relative to the cutter blade. Said chip guide device follows the cutter blade at an angular distance as seen from a point of a fixed external coordinate system when the reamer is rotating in a proper cutting direction.

The chips are collected and guided with the chip-guide device disposed angularly between the cutter blade and one first guide strip disposed angularly close relative to the cutter blade.

The chips are collected and guided with the chip-guide device disposed angularly between one first guide strip and the second guide strip disposed angularly opposite to the cutter blade.

The chips not collected and guided by the chip guide device are collected and guided with a safety zone serving as a zone for safe elimination of remaining chips and following to the trough and the steep rise at an angular distance, as seen from a point of a fixed external coordinate system when the reamer is rotating in a proper cutting direction. Said safety zone coincides for practical purposes with the circumferential face of the base body.

Chilling agent is fed through a chilling-agent feed channel to a groove disposed within the region of the safety zone.

An advantage of the invention single-blade reamer includes that chips, which fall between the cutter blade and the following first guide strip or, respectively, between the first and second guide strip, are guided such that they cannot pass between the bore wall and the second guide strip. It is thereby assured that an optimum borehole surface with an exact processing dimension is achieved, even if chips from the premachining still remain in the borehole at the time when the fine processing is started.

According to a preferred embodiment, a trough or vat is provided, which includes several zones or, respectively, regions of different depth, and is disposed between the two guide strips, which trough lowers slowly while advancing in circumferential direction, and as seen in the opposite direction to the rotation direction of the reamer into a first angular zone, in the direction of the rotation axis of the reamer and which finally quickly rises again over a second angular zone of the tool. The chips enclosed between the bore wall and the base body of the reamer are received by the trough and thus cannot drive the reamer away from its predetermined position. The friction exerted by the borehole wall during the rotation of the reamer onto the enclosed chips is furthermore reduced such that the chips can also not pass between the second guide strip and the bore wall.

According to a further preferred embodiment of the invention, a region serving as a safety zone follows to the trough in the direction opposite to the rotation motion direction, which region prevents that chips, protruding from the trough, reach between the guide strip and the bore wall.

Furthermore, an embodiment is preferred, where a groove is provided which is disposed in the safety zone and which is connected to a chilling-agent feed line. The chilling agent fed into this zone generates a flow, which keeps the chips away from the guide strip joining immediately at this zone.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 5 is a substantially enlarged sectional view of a single-blade reamer similar to the view of FIG. 3, however where a sump is disposed between the blade and a first guide strip.

DESCRIPTION OF INVENTION AND PREFERRED EMBODIMENT

Figure 1:
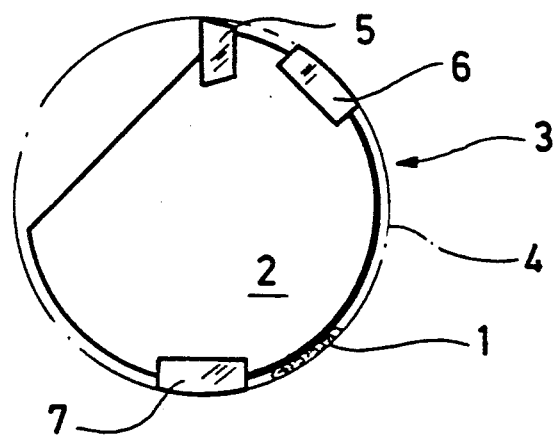
FIG. 1 is a front elevational view of a conventional reamer disposed in a borehole.

In accordance with the present invention, there is provided a single-blade reamer with cutter plate attached to a base body and exhibiting at least one cutter blade and two guide strips, disposed at the circumference of the base body. Chips generated by the cutter blade pass in general into the chip space, which is formed by the face of the base body 2, running at an inclined angle toward the blade 5, and by the borehole wall. A chip-guide device 8, 9, 10, 11, 12, 48, 19, 50, 51 is disposed angularly between the cutter blade 5, 45 and one second 7, 47 guide strip disposed angularly remote relative to the cutter blade 5, 45. Said chip guide device 8, 9, 10, 11, 12, 48, 19, 50, 51 follows the cutter blade 5, 45 at an angular distance as seen from a point of a fixed external coordinate system when the reamer 30 is rotating in a proper cutting direction.

The chip-guide device 48, 49, 50, 51 can be disposed angularly between the cutter blade 45 and one first guide strip 46 disposed angularly close relative to the cutter blade 45.

The chip-guide device 8, 9, 10, 11, 12 can be disposed angularly between one first guide strip 6 and the second guide strip 7 disposed angularly opposite to the cutter blade 5.

The chip-guide device can be formed into a circumferential face of a base body 20 as a sump 8, 9, 10, 48, 49, 50. The sump 8, 9, 10, 48, 49, 50 can exhibit several zones of different depth.

A trough 8, 48 of the sump 8, 9, 10, 48, 49, 50 can lower slowly toward the rotation axis of the reamer 30 in a first angular zone representing the trough 8, 48 following a front edge of the sump 8, 9, 10, 48, 49, 50 at a varying angular distance as seen from a point of a fixed external coordinate system when the reamer 30 is rotating in a proper cutting direction. The sump can finally steeply rise again in a second angular zone 9, 49.

A safety zone 10, 50 can be provided, serving as a zone for safe elimination of remaining chips, and can follow the trough 8, 48 and the steep rise 9, 49 at an angular distance, as seen from a point of a fixed external coordinate system, when the reamer 30 is rotating in a proper cutting direction. Said safety zone 10 can coincide for practical purposes with the circumferential face of the base body 20.

A groove 11, 51 can be disposed within the region of the zone 10, 50 and can be connected to a chilling-agent feed channel 12.

The chip-guide device can extend at least over the length of the guide strips 6, 7, 46, 47.

The schematic illustration of FIG. 1 allows to recognize that, during the fine processing of boreholes, there are chips 1, which can pass from the preceding processing stage between the base body 2 of the reamer 3 and the borehole wall 4, and in fact in the space delimited by the cutter plate or, respectively, the cutter blade 5, and the following first guide strip 6, and/or in the space delimited by the first and second guide strips 7. According to assignee's present technology, the chips can thus get jammed between the base body and the borehole wall 4, such that the final dimension of the bore deviates from the predetermined set value. In addition, the surface of the processed borehole can be damaged and interfered with.

Figure 2:
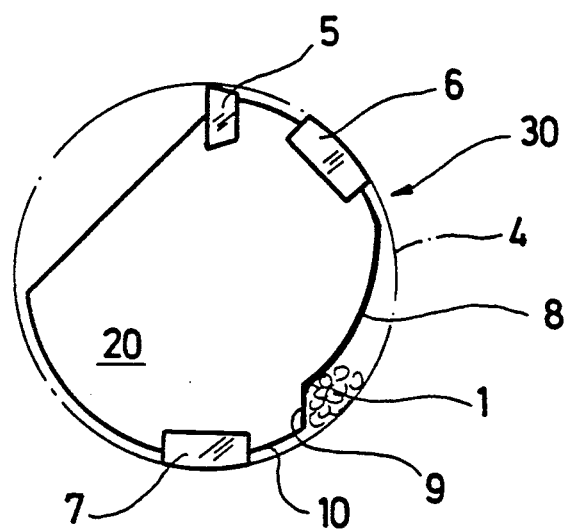
FIG. 2 is a front elevational view of a single-blade reamer disposed in a borehole with a chip-guide device disposed between the guide strips.

FIG. 2 illustrates a front view of a reamer 30, according to the invention, with a chip-guide device, which is formed as a trough 8 or vat disposed between the guide strips. The same parts are designated with the same reference numerals in the various figures. It can be recognized from the front view of FIG. 2 that the trough 8 in the first angular zone relative to the rotation axis lowers slowly and gradually in the direction of the rotation axis of the reamer 30 and that the trough finally ends in a steep shoulder 9 over a second angular zone. Thus. the space between the bore wall and the base body 20 of the reamer gradually expands in the first angular zone of the trough 8. Chips 1, which have passed between the reamer and the bore wall 4, are received and carried along by the trough 8 of the rotating reamer 30. As a second angular zone, the steeply rising shoulder 9 follows to the slowly falling trough 8. This prevents that the chips, which have collected in the trough 8, migrate and move in the direction of the guide strip 7, disposed opposite to the cutter blade 5.

It can be recognized from FIG. 2 that the second angular zone passes into a further angular zone, which is a safety zone 10, which safety zone 10 prevents that chips. beyond the shoulder 9, attach themselves at the second guide strip 7 and damage the second guide strip 7.

A groove 11 of a chip-discharge device is illustrated in FIG. 3, where again the same parts have been designated with the same reference numerals, and where the groove 11 is disposed in the safety zone 10. The chip-discharge device is connected to a chilling-agent feed channel 12, compare FIG. 4. In case of an internal, direct chilling-agent feed, it is possible to feed a cooling agent under pressure through this groove 11, whereby a flow, directed from the second guide strip 7 toward the shoulder 9, is generated, which flow additionally prevents that the chips reach the second guide strip 7.

Figure 4:
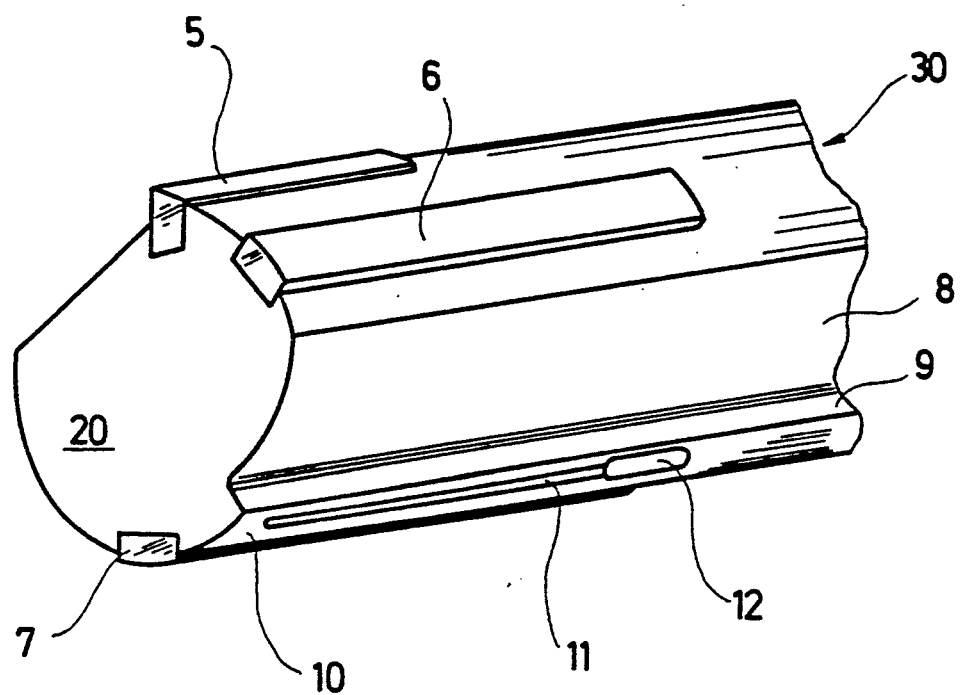
FIG. 4 is a perspective view of the single-blade reamer illustrated in FIGS. 2 and 3.

The perspective illustration of the single-blade reamer according to FIG. 4 illustrates the transition of the groove 11 into a chilling-agent feed channel 12. The formation of the chip-guide device becomes particularly clear from this figure. According to the embodiment illustrated in FIG. 4, the trough of the chip-guide device extends over a region which is longer than compared to the guide strips 6, 7.

It becomes clear immediately from the above-recited, that such a chip-guide device with decreased dimensions can also be disposed between the cutter blade 5 and the first guide strip 6. It is further possible to provide a chip guide device, both between the cutter blade 5 and the first guide strip 6, as well as between the two guide strips 6 and 7.

Figure 3:
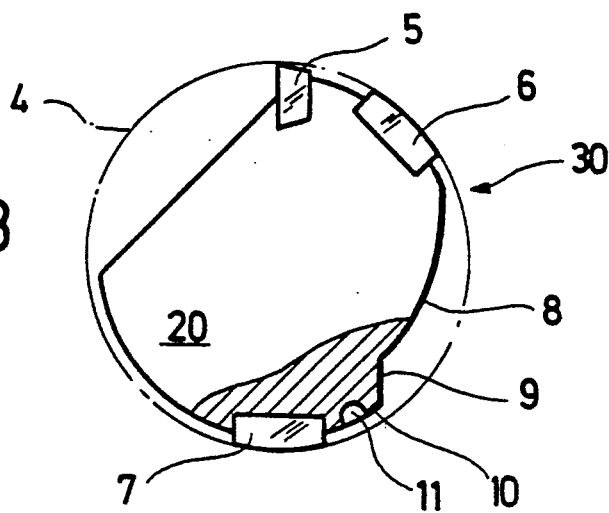
FIG. 3 is a single-blade reamer according to FIG. 2, in part as a sectional view, where the chilling-agent feed groove can be recognized.

FIG. 5 illustrates an embodiment where the chip-guide device 48, 49, 50, 51 is not disposed between the two guide strips 46, 47, but instead between the cutter blade 45 and the first guide strip 46. In comparison to the embodiment illustrated in FIGS. 2 and 3, the chip guide device 48, 49, 50, 51 of FIG. 3 is formed so small that it can be disposed between the blade 45 and the first guide strip 46, i.e. the extension of the chip guide device 48, 49, 50, 51 along the circumferential area of the reamer is substantially smaller than the extension of the chip guide device 8, 9, 10, 11 disposed between the first guide strip 6 and the second guide strip 7. The cross-section of the chip-guide device between the cutter plate or, respectively, the blade 45, and the first guide strip 46 corresponds to the cross-section illustrated in FIGS. 2 and 3.

In principle, the disposition of the guide strips 6, 7, 46, 47 is substantially independent of the position of the chip sump.

A cooling agent feed can be provided at a geometrical location (FIG. 5) relative to the sump location which corresponds to the respective relative positioning of the cooling agent feed and the sump in the embodiment of FIG. 3.

Summarizing, it becomes clear that chips, generated during the preprocessing steps, and which have remained in the bore and passed into the intermediate space between the base body and the reamer, can be safely guided and led away by the chip-guide device, such that they do not exert a negative influence onto the final diameter of the borehole and such that they do not interfere with the fine processing quality of the borehole wall. It has been found that, even in case of rotation speeds of 3000 rpm, the chips, which have penetrated between the reamer and the bore wall, can be safely guided.

The single-blade reamer has preferably a base body which is formed as a cylinder section, where the cross-section of the cylinder exhibits a substantially planar surface corresponding to a chord of a rotation cylinder circle disposed in front of the cutter blade, and having a length of from about 1.3 to 1.7 times the radius of the single-blade reamer and preferably between 1.4 and 1.6 times the radius of the single-blade reamer. The second guide strip is preferably disposed at an angle from about 30 to 60 degrees away relative to the cutting edge of the cutter blade. The second guide face is preferably disposed at an angle from about 175 to 185 degrees away from the cutting edge of the cutting blade. The groove for the chilling fluid is preferably disposed from about 20 to 30 degrees ahead of the second guide strip, and more preferably from about 25 to 30 degrees ahead of the second guide strip. The width of the groove can be from about 5 to 15 degrees and is preferably between 6 and 10 degrees. The groove preferably has a cross-section which corresponds to between a one-third and a two-thirds circle, i.e. for example, a half-circle. The steep rise of the trough can be from about 50 to 30 degrees ahead of the second guide strip. The direction of the slope can form an angle of from about $+10$ to $-10$ degrees relative to an intersection line between the cutting edge and the contact area of the second guide strip, and preferably from $+5$ to $-5$ degrees relative to the connection line between the cutter edge and the second guide strip support face. The slope can be provided by a planar surface. The trough 8 can start in an area from about 45 to 90 degrees following the cutter edge and is preferably disposed in an area of from about 60 to 70 degrees relative to the cutter edge. The initial form of this trough can correspond to a logarithmic spiral which begins at this point and which runs inwardly to the beginning point of the recited steep edge. Alternatively the trough 8 can be provided by a planar surface. The first guide strip can be disposed at an angle from about 30 to 60 degrees relative to the cutter blade edge and is preferably disposed at an angle of from about 40 to 50 degrees relative to the cutter blade edge. The extension of the groove 11 can start at a distance of from about one half to two times the thickness of the cutter blade relative to the end of the base body. The diameter of the base body can correspond to 0.9 to 0.99 of the distance between the cutting edge and the support area of the second chip guide and is preferably from about 0.93 to 0.97 of the said distance.

The length of the guide strips can correspond to from about 1 to 2 times the diameter of the base body.

The guide strips preferably have an outer cylinder surface, which corresponds to a radius of curvature which is from about 0.3 to 0.9 and preferably 0.5 to 0.8 times one half of the distance between the cutter blade edge and the support face of the second guide chip.

It will be understood that each of the elements described above, or two or more together, may also find a useful application in other types of guide devices differing from the types described above.

While the invention has been illustrated and described as embodied in the context of a single-blade reamer with chip-guide device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A single-blade reamer for cutting in a cutting direction, the reamer comprising a base body having an outer circumference, a cutter plate attached to the base body for performing a cutting action when the base body is rotated in the cutting direction, a first guide strip attached to the base body, a second guide strip attached to the base body and disposed approximately opposite the cutter plate, wherein the first guide strip is disposed spaced from the cutter plate in a direction opposite the cutting direction and between the cutter plate and the second guide strip, a chip-guide device disposed angularly between the first guide strip and the second guide strip, the chip-guide device being a valley defined in the base body, the valley having a first zone and a second zone, the first zone gradually beginning at the outer circumference of the base body and sloping radially inwardly from the outer circumference of the base body in a direction opposite the cutting direction, and the second zone steeply sloping radially outwardly to the outer circumference of the base body, and wherein the chip-guide device extends in axial direction of the base body at least over the length of the guide strips.

2. The reamer according to claim 1, comprising a safety zone adjacent the valley in the direction opposite the cutting direction, the safety zone coinciding with the outer circumference of the base body.

3. The reamer according to claim 2, wherein a groove is defined in the safety zone, the groove being in communication with a chilling-agent feed channel.

4. A single-blade reamer for cutting in a cutting direction, the reamer comprising a base body having an outer circumference, a cutter plate attached to the base body for performing a cutting action when the base body is rotated in the cutting direction, a first guide strip attached to the base body, a second guide strip attached to the base body and disposed approximately opposite the cutter plate, wherein the first guide strip is disposed spaced from the cutter plate in a direction opposite the cutting direction and between the cutter plate and the second guide strip, a chip-guide device disposed angularly between the cutter plate and the first guide strip, the chip-guide device being a valley defined in the base body, the valley having a first zone and a second zone, the first zone beginning at the outer circumference of the base body and gradually sloping radially inwardly from the outer circumference of the base body in a direction opposite the cutting direction, and the second zone steeply sloping radially outwardly to the outer circumference of the base body.

5. The reamer according to claim 4, comprising a safety zone adjacent the valley in the direction opposite the cutting direction, the safety zone coinciding with the outer circumference of the base body.

6. The reamer according to claim 5, wherein a groove is defined in the safety zone, the groove being in communication with a chilling-agent feed channel.

7. The reamer according to claim 4, wherein the chip-guide device extends in axial direction of the base body at least over the length of the guide strips.

* * * * *